United States Patent [19]

Hubbard

[11] Patent Number: 5,004,263
[45] Date of Patent: Apr. 2, 1991

[54] UTILITY CART

[76] Inventor: Phillip W. Hubbard, P.O. Box 5287, Valdosta, Ga. 31603

[21] Appl. No.: 556,003

[22] Filed: Jul. 20, 1990

[51] Int. Cl.⁵ ............................................. B62B 1/20
[52] U.S. Cl. .................................. 280/645; 280/655; 280/47.18; 280/47.24
[58] Field of Search ................. 280/638, 35, 639, 38, 280/641, 643, 645, 651, 652, 47.17, 47.18, 47.2, 47.24, 47.371, 63

[56] References Cited

U.S. PATENT DOCUMENTS

| 3,082,016 | 3/1963 | Pratt | 280/641 |
| 3,223,429 | 12/1965 | Hastings | 280/641 |
| 3,493,262 | 2/1970 | Ferneau | 280/641 |
| 3,795,565 | 9/1973 | Ferneau | 296/20 |
| 4,170,379 | 10/1979 | Eicher | 296/20 |
| 4,620,712 | 10/1986 | Blackwell | 280/47.2 |

Primary Examiner—Andres Kashnikow
Assistant Examiner—Richard Camby
Attorney, Agent, or Firm—Thomas C. Saitta

[57] ABSTRACT

A handcart having a relatively horizontal load platform for carrying a load, relatively small wheels attached to the front of the load platform which extend slightly below the platform, handles extending from the rear of the load platform, a set of large wheels pivotally attached to the rear of the load platform, and a support post also pivotally attached to the rear of the load platform, where the large wheels and the support post can be pivoted rearward from a downward position, through and between the handles, to an upright vertical position.

12 Claims, 2 Drawing Sheets

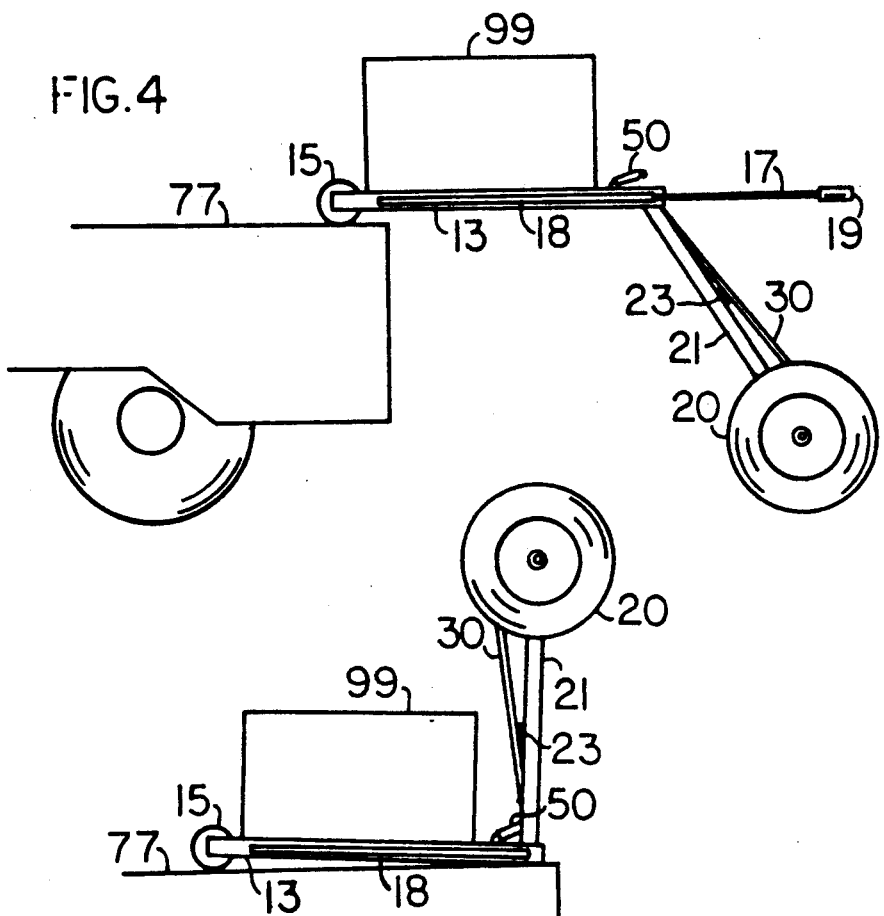
FIG. 4
FIG. 5
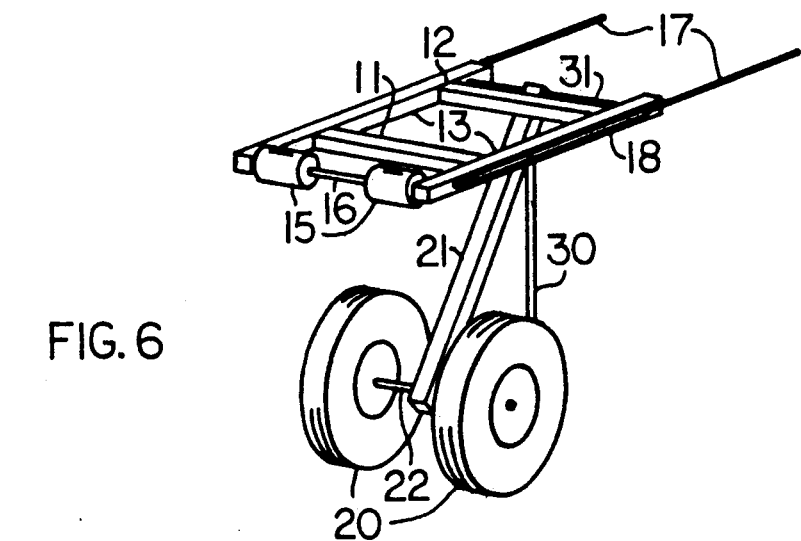
FIG. 6

UTILITY CART

BACKGROUND OF THE INVENTION

The invention relates generally to the field of utility carts having a relatively horizontal load platform and foldable wheels. More particularly, the invention relates to the field of such carts where the wheels pivot above the load platform, such that the cart can be inserted into the bed of a vehicle with the load platform remaining horizontal.

Vehicles such as trucks, vans and station wagons are designed for transportation of large or bulky loads. Such loads are difficult to move or lift, so that loading them into or out of the vehicle is also difficult. Often the weight of the object or objects may require two individuals to load and remove. Carts have been manufactured which allow the user to place the cart, fully loaded with the goods to be transported, into the vehicle bed itself, even when the goods are very heavy. Once at the destination, the cart is removed from the vehicle, goods still loaded on it, and the goods taken to wherever desired. To accomplish this, the carts are structured so that the wheels are foldable, collapsible or pivotable. In practice, the end of the cart load platform is placed on vehicle bed, the wheels and any support members are folded, collapsed or pivoted out of the way and the main portion of the cart load platform is then shoved or rolled into the vehicle bed. Unloading the cart is accomplished by reversing the steps.

For example, Pratt in U.S. Pat. No. 3,082,016 teaches an auto cart having scissors type retractable wheels. The wheels are necessarily small in diameter, since the wheels fold toward the load platform of the cart and the frame actually rests on wheel axles for sliding the cart in and out of the vehicle. Hastings in U.S. Pat. No. 3,223,429 teaches a cart having small front wheels for use in the vehicle bed and large rear wheels for rolling the cart. The rear wheels pivot up to the cart load platform, but because of their size additional legs are required to maintain the load platform in horizontal position within the vehicle bed. Ferneau in U.S. Pat. No. 3,759,565 teaches a one-man cart having a set of scissors type wheels and a folding rear wheel support. A complicated adjustment mechanism allows the height of the cart to be altered. Eicher in U.S. Pat. No. 4,170,379 shows a trailer type hand cart having large wheels located on each side of the load platform. The wheels pivot to each side of the load platform for loading the cart into a vehicle. Bourgraf et al. in U.S. Pat. No. 4,369,985 teaches a cart having two sets of foldable wheels which collapse against the load bed when inserted into the vehicle platform.

The above devices suffer from various problems. Often the heavy load must be balanced and held up by the individual while the wheel structures are folded, collapsed or pivoted by pushing the frame against the vehicle. In most, the wheels remain below the surface of the load platform and support the load platform while in the vehicle bed, allowing the cart to roll and move within the vehicle. This can cause damage in the case of heavy loads. Some have small wheels, which are useless in circumstances with heavy loads on soft or non-level terrain. Most have complicated structures for folding the wheels and support members with excess pivots, latches, etc. which are subject to mechanical failure under heavy or repeated usage.

It is an object of the invention to provide a cart capable of supporting a heavy load and capable of movement over uneven or soft terrain which can be folded to allow the cart to be placed in the bed of a vehicle and removed while fully loaded with the cart load platform remaining horizontal.

It is a further object to provide such a cart where the mechanism for folding the wheels and support members is structurally simple, yet still capable of enduring heavy loads.

It is a further object to provide such a cart where the wheels and support members are pivoted above the level of the cart load platform so that the cart does not roll when placed within the vehicle bed.

BRIEF SUMMARY OF THE INVENTION

The invention comprises a relatively horizontal load platform or load frame having a set of small wheels or other roller means on the bottom side of the front end of the load platform. Retractable or removable handles extend from each side of the rear of the load platform. A leg or set of legs is pivotally attached to the load platform at or near the rear end, the lower end of the legs ending in a set of large wheels. A support post is also pivotally attached at or near the rear of the load platform. Both the legs and the support post are pivotable from positions extending below the load platform to positions extending vertically above the load platform. In the downward position the legs will pivot to the forward direction up to an angle of approximately 45 degrees relative to the load platform, the forward motion being limited by the legs abutting a structural member of the load platform. In the downward position the support post will not pivot in the forward direction beyond a 90 degree angle relative to the load platform, i.e., the support post will not pivot forward beyond a substantially vertical position. A flange near the pivot point of the support post prevents further movement by abutting a structural member of the load platform. Both the legs and the support post can pivot in the rearward direction through the horizontal plane to extend vertically above the load platform at a 90 degree angle. A locking mechanism secures the support post in the lower position and must be released to position the legs and support post in the vertical direction. Likewise, a locking mechanism secures the legs and support post in the vertical upper position.

The large wheels and the support post maintain the load platform in a relatively horizontal position. The cart is moved by raising up on the handles to lift the support post off the ground and rolling the cart on the large wheels. The load is placed on the load platform and can be inserted into a vehicle and removed from a vehicle without unloading the cart itself. To accomplish this, the cart is rolled to the edge of the vehicle bed and the front end is inserted into the vehicle such that the small wheels are on the vehicle bed. The locking mechanism maintaining the support post in the downward position is released. The rear of the cart is raised slightly by lifting the handles. This motion causes the large wheels and the support post to swing rearward through vertical, the cart having been raised sufficient distance to allow the wheels to clear the ground surface. The load platform is now rolled almost fully into the vehicle bed and set down. The legs and support post are now pivoted to the upward vertical position and locked into place. The load platform is now completely inserted into the vehicle and the handles are now removed or retracted, such that the entire cart is now contained inside the vehicle. To unload, the sequence is reversed.

BRIEF DESCRIPTION OF THE DRAWINGS

FIG. 4 is a side view showing the invention partially inserted into the load bed of a vehicle with the wheels in the released position.

FIG. 5 is a side view showing the invention fully inserted in the load bed of a vehicle with the wheels locked in the upright position.

FIG. 6 is a perspective view of an alternative embodiment of the invention, showing a single leg member.

DETAILED DESCRIPTION OF THE INVENTION

Figure 1:
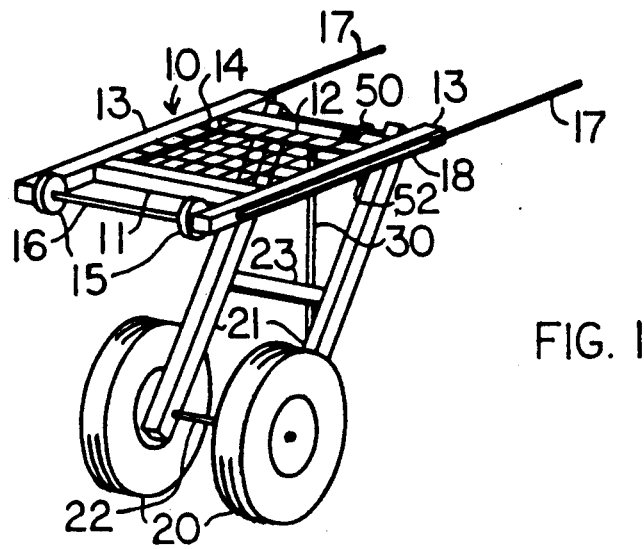
FIG. 1 is a perspective view of the invention.
Figure 2:
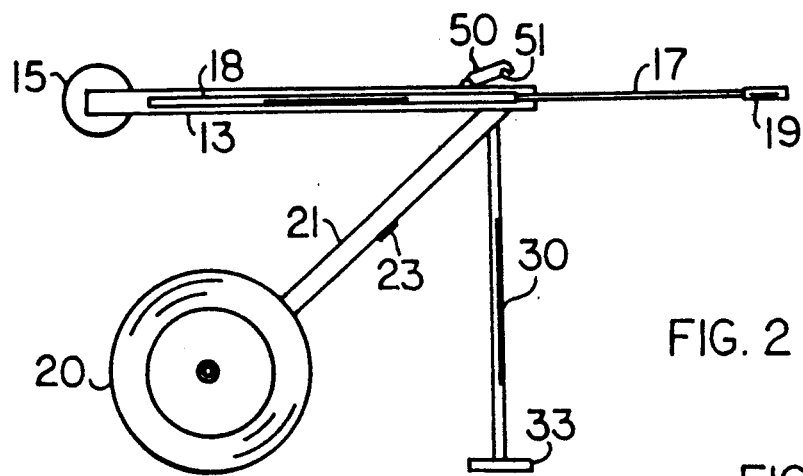
FIG. 2 is a side view of the invention.

The invention is a handcart for transporting loads which is adapted to be inserted into and removed from the horizontal be 77 of a truck, van or station wagon without requiring removal of the load from the handcart. As shown in FIGS. 1 and 2, the handcart comprises a relatively horizontal load platform 10 having a front end member 11, a rear end member 12 and two side members 13. Load platform 10 is rectangular in shape and is preferably constructed of high strength metal bar or tube stock, or of similar structural materials, welded or mechanically fastened together. Load platform 10 has a relatively planar upper surface for receiving the load to be carried and may be of open framework construction or may further comprise a bed 14 of sheet metal, wood, wire mesh or other suitable material extending between the framework members for carrying loads of smaller size. Side members 13 extend beyond front end member 11 and rear end member 12. The extension beyond front end member 11 allows for attachment of roller means such as load bed wheels 15. Load bed wheels 15 are of small diameter but are of sufficient size and are located such that they extend partially below the bottom surface of load platform 10. The wheels 15 may be attached by running an axle 16 between the two side member 13 extensions, as shown, or they may be attached to individual short rods extending from the side members 13. The wheels 15 may also be attached directly to the front end member 11. Additionally, rollers or like members may be substituted for the wheels 15, the main requirement being that the rolling surface extends below the bottom surface of the load platform 10.

Extending from each of side members 13 are positionable handle means 17. Handles 17 are retractable or removable. As shown, the handles 17 fit into handle tubes 18 located on the outer surface of each of side members 13. The relationship of handles 17 to handle tubes 18 is such that the handles 17 are completely removable from the handle tubes 18 or they may be structured so that they may be inserted almost completely into handle tubes 18 so that the ends of handles 17 do not extend beyond the rear ends of side members 13 when not in use as seen in FIG. 5. To use handles 17 they are pulled out from handle tubes 18, with a sufficient length of each handle 17 remaining in the handle tube 18 to allow lifting of the handcart. Handles 17 may also have grip members 19 for easier control.

The main wheels 20 are pivotally attached to load platform 10 by leg members 21. Leg members 21 extend from the interior sides of side members 13, so that when they are pivoted to the vertical position, the leg member 21 will pass between handles 17, with the length of leg members 21 allowing wheels 20 to pass beyond the ends of handles 18. Wheels 20 are mounted on a main axle 22 running between the two leg members 21, or the wheels 20 may be attached to short posts extending from the bottoms of leg members 21. Wheels 20 are preferably relatively large in diameter, for example from 10 to 20 inches in diameter, to allow easy movement of the handcart over rugged or soft terrain. A cross brace 23 extends between the two leg members 21 to provide structural integrity and to retain support post 30 in the upward vertical position when leg members 21 are locked in the upward vertical position. Alternatively, a single centrally located leg member 21 could be substituted for the pair of leg members 21, with the wheel axle 22 extending outward to both sides for attachment of wheels 20, as shown in FIG. 6.

Leg members 21 ar pivotally attached to the load platform 10 by a rod (not shown) running between the rearward extending portions of side members 13. This rod extends through leg members 21 in circular apertures, formed by attaching a receiving tube to the ends of leg members 21 or by drilling a hole adjacent the ends of leg members 21. This construction allows the leg members 21 and wheels 20 to be pivoted rearward from a downward position to an upright vertical position. In the downward position, leg members 21 extend in the forward direction at an acute angle relative to the load platform 10, the maximum amount of forward extension being determined by the positioning of the rod 24 relative to the rear end member 12, in that the upper surface of the leg members 21 will abut the lower surface of the rear end member 12 of the load platform 10 and thus be prevented from further forward pivoting. The preferable angle between leg members 21 and load platform 10 and the preferable length of leg members 21 is such that the wheels 20 are ultimately positioned forward of the midpoint of the load platform 10. The angle and length must also correspond to the necessary clearance height of load platform 10 for insertion into a vehicle. The height of load platform 10 can be adjusted by placing shims between the leg members 21 and the rear end member 12.

Figure 7:
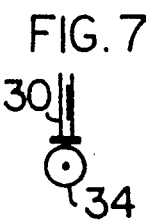
FIG. 7 is a detail view of a roller member on the support post.

Support means such as a support post 30 is pivotally attached by a tube 31 encasing the rod extending between leg members 21, this tube 31 preferably extending from on leg member 21 to the other. Flange 32 extends horizontally in the forward and rearward direction below tube 31, flange 32 being perpendicular to support post 30. Flange 32 abuts the lower side of rear end member 12 when the support post 30 is in the downward vertical position, thus preventing support post 30 from pivoting forward beyond an angle of 90 degrees relative to load platform 10. Tube 31 allows support post 30 to be pivoted about so that the support post 30 may be rotated into an upward vertical position, in which case flange 32 abuts the upper side of rear end member 12 so that the support post 30 cannot pivot forward beyond 90 degrees. Support post 30 is the same length as the distance from the bottom of the wheels 20 to the load platform 10, such that the support post 30 maintains the load platform 10 in a relatively horizontal position. Support post 30 preferably ends in a foot member 33 for placement on soft or uneven terrain. Foot member 33 could be replaced by a roller member 34, such as a caster or small wheel for use on level floor surfaces, as seen in FIG. 7.

Figure 3:
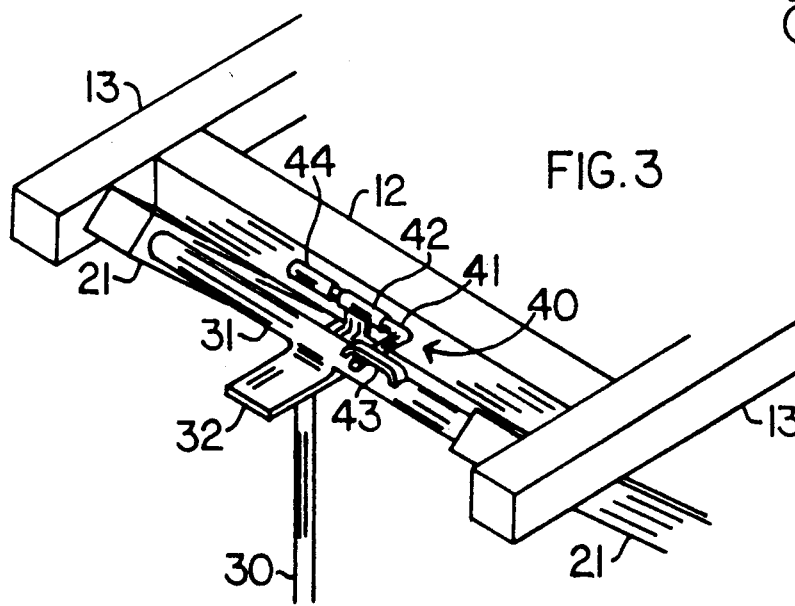
FIG. 3 is perspective view of the pivot and locking mechanisms.

For added safety, a releasable downward locking mechanism 40 is used to lock support post 30 in the downward position, as shown in FIG. 3. Locking mechanism 40 comprises a substantially right angle sliding pin 41 which is attached to flange 32 by a retainer tube 42 and a retainer bracket 43 mounted on tube 31. A detent tube 44 is attached to rear end member 12, such that the central openings of detent tube 44 and retainer tube 42 are in alignment when the support post 30 is in the downward vertical position. Bracket 43 allows the end of sliding pin 41 to be inserted into detent tube 44 to lock the support post 30 in place. To pivot the support post 30, sliding pin 41 is removed from detent tube 44, allowing the support post 30 to pivot around rod 24. Any similar locking mechanism can be substituted for this arrangement, so long as it serves to retain the support pos 30 in position.

As previously discussed, the leg members 21 and support post 30 can be pivoted around rod 24 to an upright vertical position, as shown in FIG. 5. It is necessary to lock the legs members 21 in this upward vertical position by a suitable upward locking mechanism. This mechanism consists of pivoting hook 50 attached to rear end member 12. Hook 50 has a slot 51 which catches a pin 52 located on the interior side of one of the leg members 21 when the leg members 21 are in the upward vertical position. The cross brace 23 between leg members 21 prevents support post 30 from pivoting out of vertical. To lower the leg members 21 and support post 30, hook 50 is released and the leg members 21 and support post 30 are allowed to pivot on rod 24. Similar locking mechanisms can be substituted for this arrangement.

FIGS. 4 and 5 illustrate the steps to place a handcart carrying a load 99 into a vehicle bed 77. The small load bed wheels 15 adjacent the front end member 11 are set into the vehicle bed 77. The locking mechanism 40 locking the support post 30 in the downward position is released to allow free movement of the support post 30. The load platform 10 is lifted upward causing the large wheels 20 to swing rearward, the cross brace 23 abutting the support post 30 and moving it rearward also. Once the wheels 20 have passed through vertical and are directed in the rearward direction the load platform 10 is rolled forward into the vehicle bed 77 and set onto the vehicle bed 77 surface. The leg members 21 are now rotated into the upright vertical position and locked in place by connecting hook 50 to pin 52. The load platform 10 is now completely inserted into the vehicle and the handles 17 are retracted or removed. To unload the handcart, the handles 17 are extended or inserted and the load platform 10 is partially pulled from the vehicle bed 77. The hook 50 is released to lower leg members 21. The load platform 10 is now pulled out so that only the front wheels 15 rest on the vehicle bed 77. The load platform 10 is lifted to swing the main wheels 20 to the front, the leg members 21 abutting against the rear end member 12 and the support post 30 dropping into the downward vertical position and locked into place by locking mechanism 40. The handcart can now be used to transport the load 99.

It will be apparent to those skilled in the art that obvious substitutions and equivalents are available for the components and mechanisms described above. The above illustrations are by way of example only, and the full scope and definition of the invention is to be as set forth in the following claims.

I claim:
1. A cart comprising:
(A) platform means providing a relatively horizontal surface capable of supporting a load, said platform means having a front end and a rear end;
(B) roller means attached to said front end of said platform means, a portion of said roller means extending below said platform means;
(C) positionable handle means extending rearward from each side of said platform means;
(D) one or more leg members pivotally attached to the rear of said platform means, said leg member or members can be pivoted from a downward position below the level of said platform means, through and between said handle means, to an upright vertical position above the level of said platform means;
(E) wheels mounted on said one or more leg members;
(F) support means pivotally attached to the rear of said platform means, said support means can be pivoted from a downward position below the level of said platform means, through and between said handle means, to an upright vertical position above the level of said platform means;
(G) releasable upward locking means to maintain said one or more leg members and said support means in the upright vertical position.

2. The device of claim 1, further comprising releasable downward locking means to maintain said support means in the downward position.

3. The device of claim 1 where said handle means are removable.

4. The device of claim 1, where said handle means are retractable.

5. The device of claim 1, further comprising a cross brace member attached between said leg members.

6. The device of claim 1, where said support means is a post.

7. The device of claim 1, where said support means has a foot member.

8. The device of claim 1, where said support means has a roller member.

9. The device of claim 1, where said releasable upward locking means comprises a hook member mounted to said platform means and a pin member affixed to one of said leg members.

10. The device of claim 2, where said releasable downward locking means comprises a sliding pin member attached to said support means and a detent tube attached to said platform means.

11. The device of claim 1, where said support means further comprises a flange member, where said flange member is adapted to abut said platform means when said support means is in either the downward or upward position.

12. The device of claim 1, where said one or more leg abuts said platform means when in the downward position.

* * * * *